Figure 1:
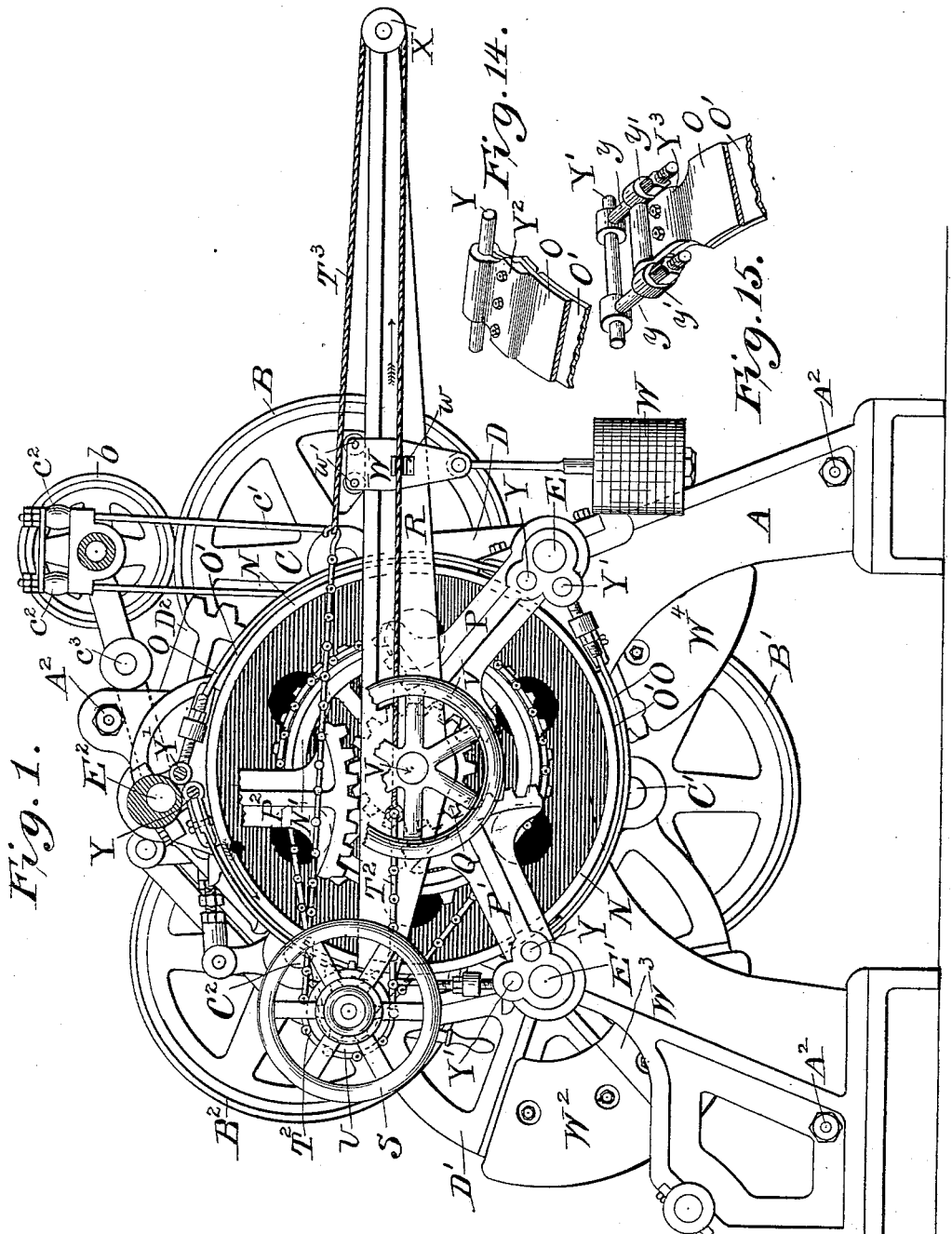

No. 616,457. Patented Dec. 27, 1898.
J. R. FORDYCE.
BALING PRESS.
(Application filed Dec. 27, 1895.)
(No Model.) 6 Sheets—Sheet 2.

No. 616,457. Patented Dec. 27, 1898.
J. R. FORDYCE.
BALING PRESS.
(Application filed Dec. 27, 1895.)

(No Model.) 6 Sheets—Sheet 3.

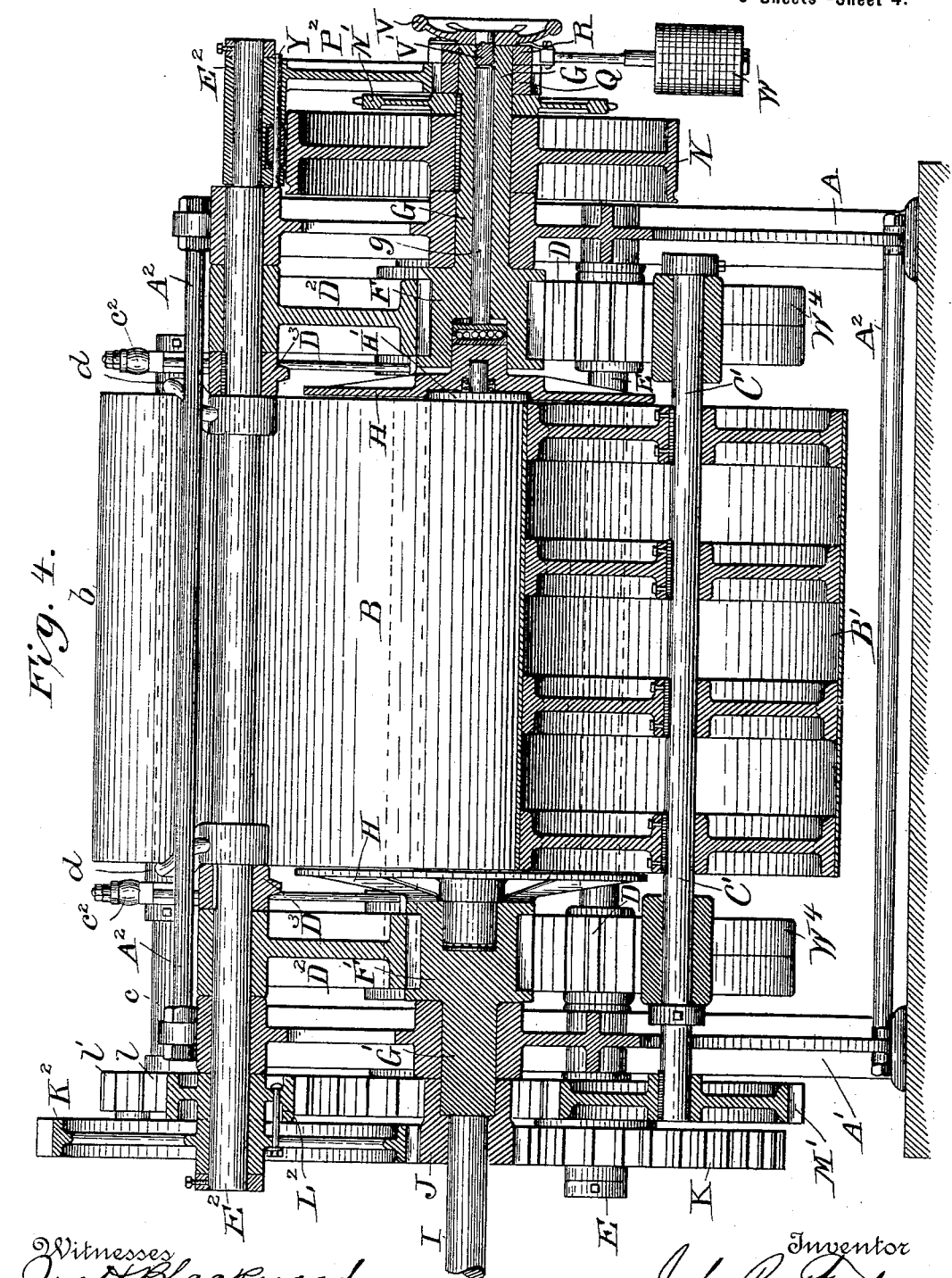

No. 616,457. Patented Dec. 27, 1898.
J. R. FORDYCE.
BALING PRESS.
(Application filed Dec. 27, 1895.)
(No Model.) 6 Sheets—Sheet 5.
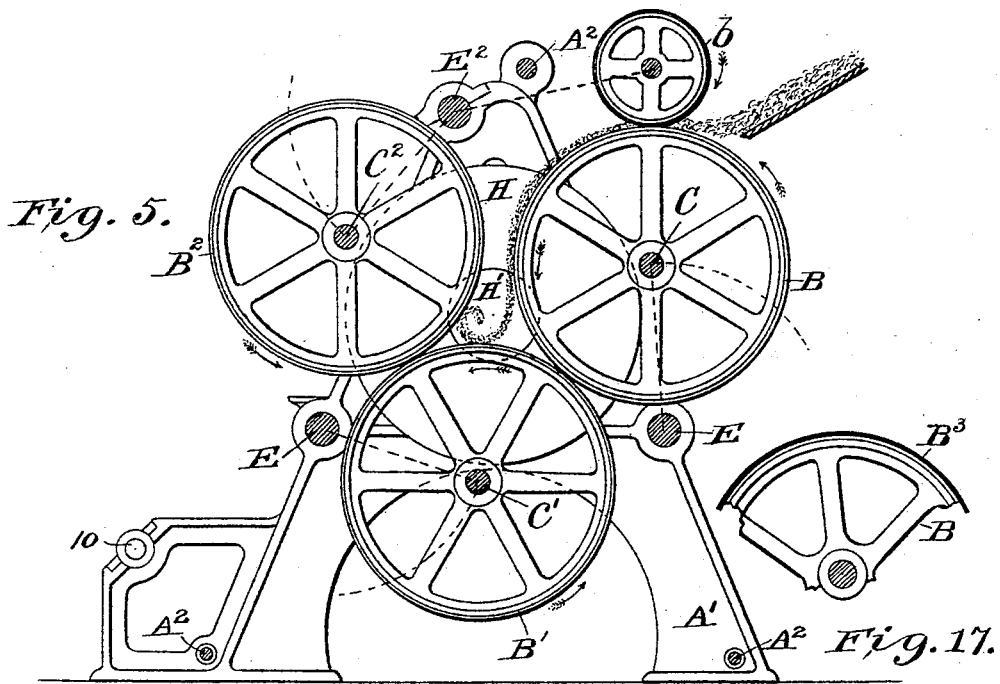
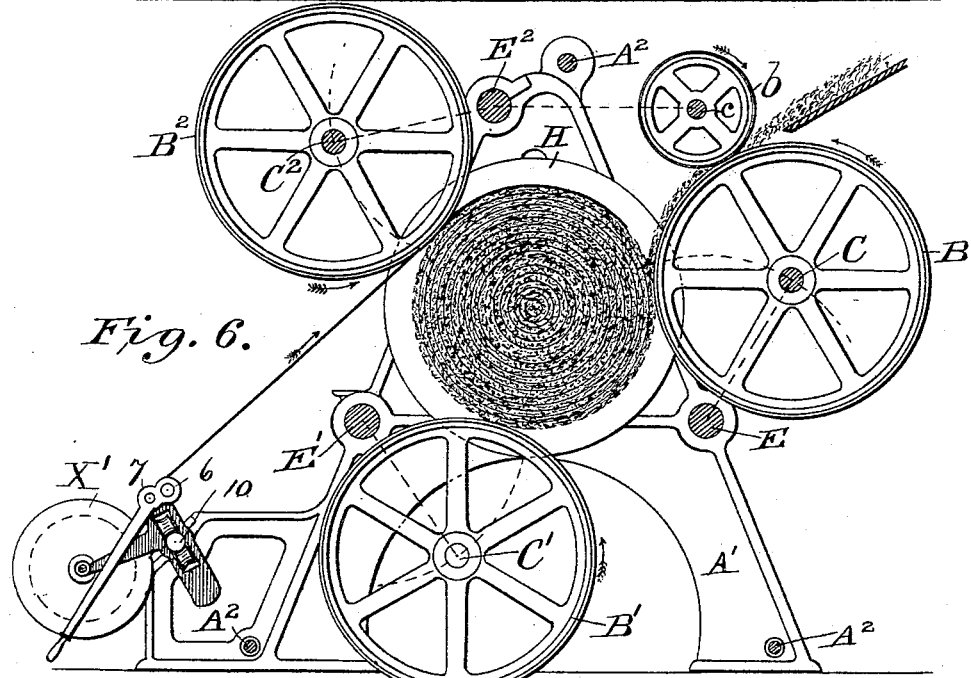
Witnesses
Jas. H. Blackwood
Albert B. Blackwood
Inventor
John R. Fordyce
by M. A. Doolittle & Son
Attorneys No. 616,457. Patented Dec. 27, 1898.
J. R. FORDYCE.
BALING PRESS.
(Application filed Dec. 27, 1895.)
(No Model.) 6 Sheets—Sheet 6.

Witnesses
Jas. H. Blackwood
H. P. Doolittle

Inventor
John R. Fordyce
by M. H. Doolittle & Son
Attorneys

THE NORRIS PETERS CO., PHOTO-LITHO., WASHINGTON, D. C.

UNITED STATES PATENT OFFICE.

JOHN R. FORDYCE, OF ST. LOUIS, MISSOURI.

BALING-PRESS.

SPECIFICATION forming part of Letters Patent No. 616,457, dated December 27, 1898.

Application filed December 27, 1895. Serial No. 573,487. (No model.)

*To all whom it may concern:*

Be it known that I, JOHN R. FORDYCE, a citizen of the United States, residing at St. Louis, in the State of Missouri, have invented certain new and useful Improvements in Baling-Presses; and I do hereby declare the following to be a full, clear, and exact description of the invention, such as will enable others skilled in the art to which it appertains to make and use the same.

My invention relates to roller baling-presses; and it consists of certain improvements in the apparatus which forms the subject of my application, Serial No. 544,900, filed April 8, 1895. In that application there are described and claimed compress-rollers hung on swinging supports and connected to a center oscillating block, by reason of which connections the rollers are permitted to approach and recede from said block and while so approaching are maintained at the same relative distance from the center, and also, in combination with such features, end rotary disks, between which and the rollers the bale is compressed. These general features I retain in the present application; but the special improvements constituting my present invention consist in a modified and simplified construction of the swinging supports and oscillating center block, whereby a constant pressure applied to the block will exert a constant uniform pressure on the roller-supports at all points of their inward and outward travel; in means for controlling the oscillation of the center block, for producing an increasing resistance on the center block or pinion as the bale increases in diameter, for compressing the bat as it comes from the condenser and before it is wrapped up as a bale, for giving the center or core of the bale an initiatory formation and start before the cotton encounters the friction and retarding action of the large end disks, for lessening the friction of the large end disks in their supports, thus making them and the machine easier to drive, for preventing the bale slipping on the end disks, and for permitting one of the end disks to recede after the bale is made, so that the bale can be easily withdrawn; in a novel arrangement of gears for driving the rolls, a novel mode of covering the finished bale with canvas, and means for unfastening one of the rolls and allowing it to swing free of the others, all of which improvements, together with additional minor details, will be more fully hereinafter described and particularly claimed.

My improved apparatus is illustrated in the accompanying drawings, in which—

Figure 2:
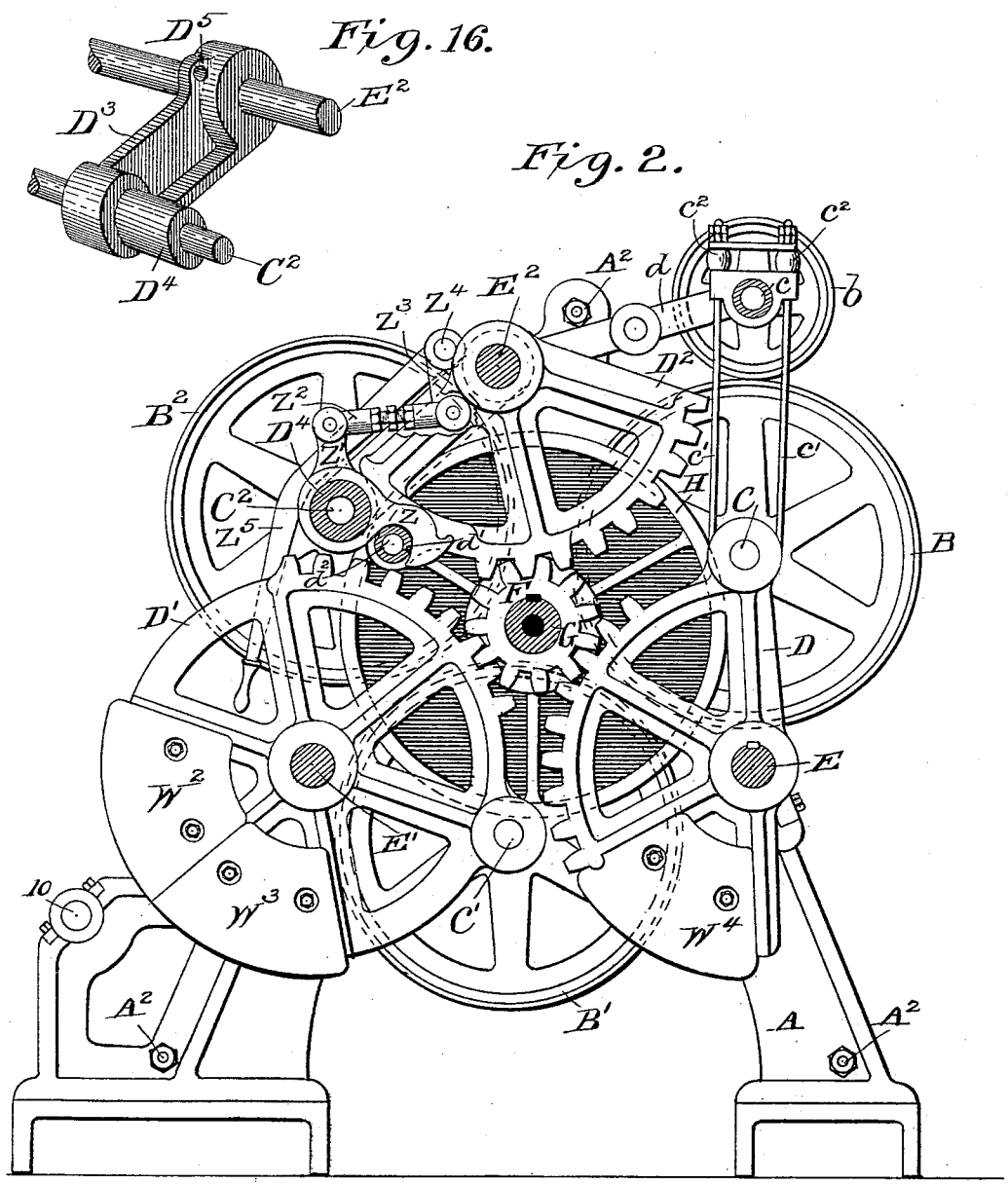
Figure 3:
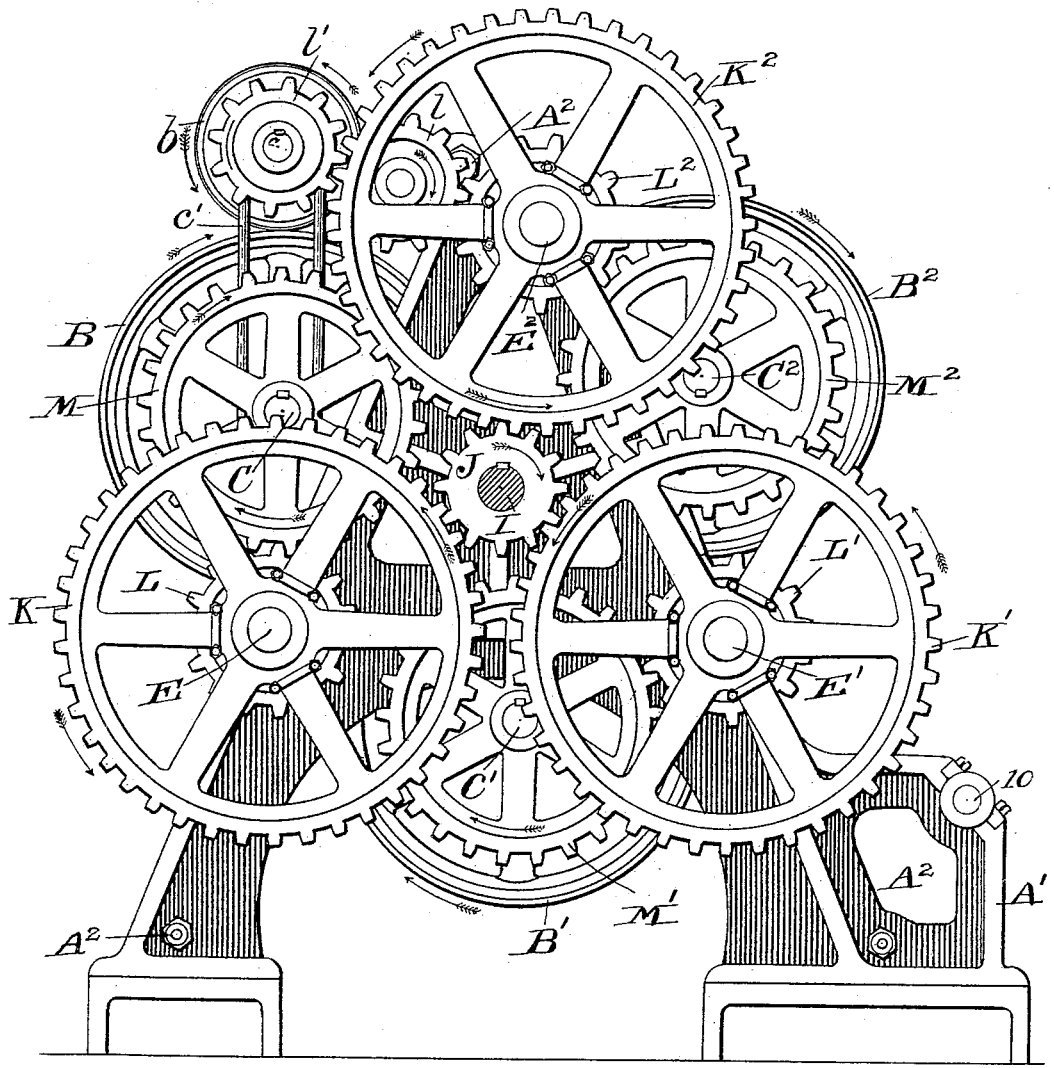
Figure 7:
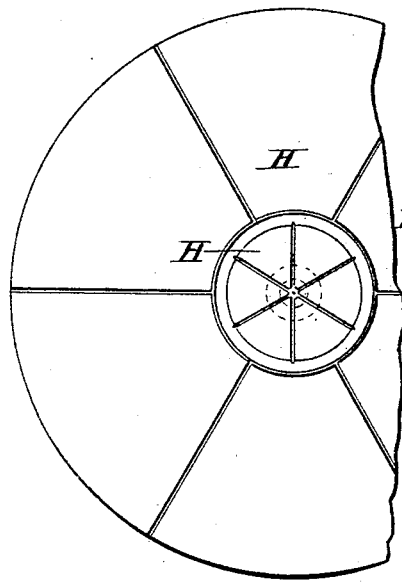
Figure 8:
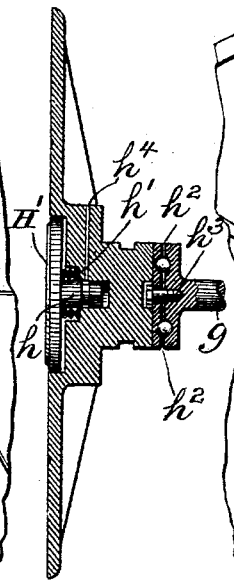
Figure 9:
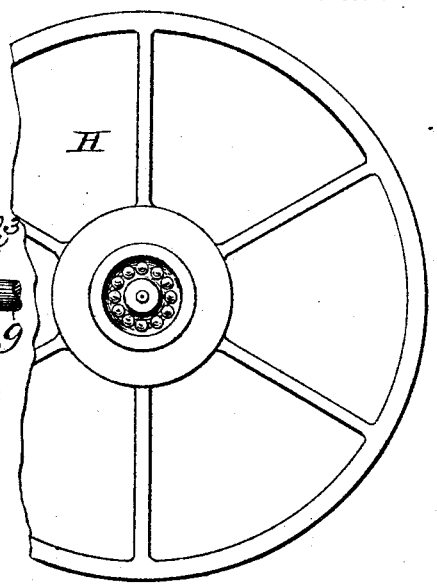
Figure 10:
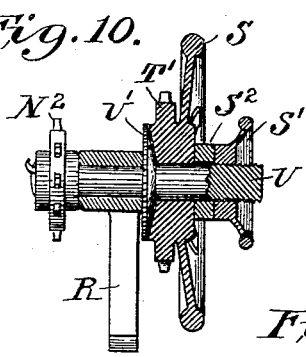
Figure 11:
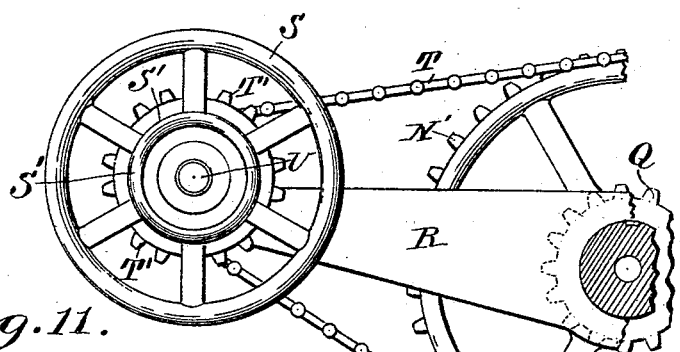
Figure 12:
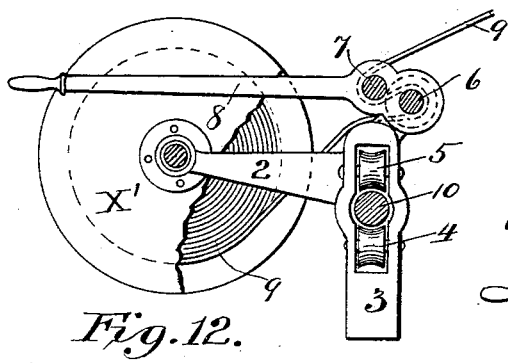
Figure 13:
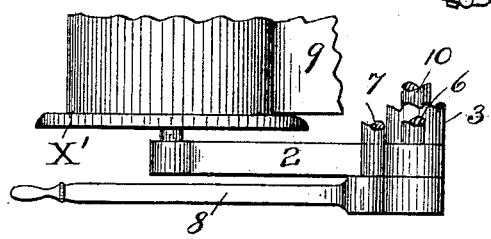

Figure 1 is a view in elevation of the right end of the machine, showing principally the brake mechanism. Fig. 2 is a similar view of the same end of the machine, showing the compression mechanism and the right end frame with the friction-wheel and clutch and the driving-gear on the left end frame removed; Fig. 3, a similar view of the opposite end of the machine, showing the left end frame, drums and shafts, and driving-gear mounted thereon; Fig. 4, a longitudinal section on the line $y\ y$ of Fig. 2; Fig. 5, a diagrammatic view showing the rolls in their initial position as the bale starts; Fig. 6, a similar view showing the rolls in their final position just as the bale is finished and before it is ready to be taken out; Fig. 7, a front face view of the end disks; Fig. 8, a central sectional view of the disks; Fig. 9, a back view of the backs of the disks; Figs. 10 and 11, details of the brake mechanism; Figs. 12 and 13, details of the canvas-holder and tension arrangement by which the bale is covered; Figs. 14 and 15, views showing the connections of the friction-bands to the brake-sectors; Fig. 16, a view showing the arm of front roller; Fig. 17, a detail showing an elastic covering for the compressing-rolls.

Similar parts are indicated by similar letters and figures of reference throughout the several views.

The framework of the machine is divided into two similar parts, designated as the "right" and "left" end frames A and A', which frames rest on channel-beams and are connected by top and bottom tie-rods $A^2$.

B, B', and $B^2$ are the compression-rollers which surround and form the bale and are rigidly mounted, respectively, on shafts C, C', and $C^2$. The rolls B $B^2$ are the upper ones and B' the lower one, and they are arranged to form an inverted pyramid. Such arrangement of the rollers is shown and described in my pending application, Serial No. 544,900. The shafts C and C' are journaled at each end to sectors D and D', respectively, while the shaft C², carrying roller B², is journaled in the arms marked D³ on shaft E², Fig. 16, and connected to the sector D² by a hook z in a manner and for the purpose hereinafter more fully described. The sectors D, D', and D² constitute the swinging supports for the compression-rollers. Sectors D are each mounted on a shaft E opposite the ends of roller B and are rigidly keyed to said shaft. Sectors D' and D² are mounted loosely on shafts E' and E², respectively.

A small feed and preliminary pressure roller b is rigidly mounted on the shaft c, which shaft is journaled at each end in the swinging arms d, hung on shaft E², which carries the sector D². This small roller b rests on the large roller B and is held against it by the tie-rods c' and rubber buffers c².

Loosely mounted in the end frames at the center of the triangle formed by shafts E, E', and E² are pinions F and F', which constitute a common center from which the compress-rollers recede and approach by action of the sectors.

H H are end disks mounted, respectively, in the hubs of the end pinions F and F' and adjacent to the ends of the compression-rollers. The purpose, construction, and operation of these disks will be more fully hereinafter described.

The driving mechanism consists of a main driving-shaft I and connected gearing. To the shaft I is rigidly connected a pinion J, which is also loosely mounted on the stem G' of the pinion F', which stem projects through the frame A', as shown in Fig. 4. Mounted loosely on the projections of shafts E, E', and E² are the large gears K, K', and K². These gears mesh with the pinion J and are rigidly connected to the smaller gears L, L', and L², respectively, which are mounted on the same shafts as K, K', and K². The gears L, L', and L² mesh with the gears M M' M², which are rigidly mounted on the roller-shafts C, C', and C². The small roller b is driven by the gear l', which is rigidly mounted on the shaft c and meshed with the idle-gear l, which in turn engages with the gear L². The teeth of the center block or pinion F mesh with the teeth of the sectors, so that their movement is controlled by the said pinion. The stem or shaft G of pinion F projects through the frame, and on it is rigidly mounted the brake-wheel N, as shown in Figs. 1 and 4. Surrounding this wheel are three flexible friction-bands O, preferably made of steel, the under surface of which is lined with leather or equivalent material O', as shown in Figs. 14 and 15, to increase the friction between the band and brake wheel. These bands are connected to brake-sectors P, P', and P² on the pulling end by the clamp Y², Fig. 14, and on the slack end by the adjustable clamp Y³ and bolts y and eye-bolts y', Fig. 15. By the use of the adjusting-bolts the bands may be shortened or lengthened to render the pressure uniform around the brake-wheel. The brake-sectors P, P', and P² are loosely mounted on the projections of shafts E, E', and E² and all mesh with the pinion Q, which is loosely mounted on center-block shaft G.

Connected rigidly to pinion Q is a brake-lever R. From an arm of this lever a weight W is suspended, provided with a carriage W', in which small wheels w' are mounted, which cause the weight to ride on said arm and travel in or out on the arm automatically, or the weight may be moved thereon by hand. Rigidly connected to the brake-wheel N is a large sprocket-wheel N', which is connected by a chain T to the small sprocket-wheel N², rigidly mounted on shaft U, Figs. 10 and 11. The shaft U is journaled in the brake-lever R on the opposite side to the weight W. On the shaft U is also mounted the sprocket-wheel T', which is rigidly joined to the hand-wheel S. These two wheels are so arranged that they may be clamped to the shaft U by the screw-clamp wheel S on the threaded end of shaft U, in which case they revolve with it or they may be loosened, when they may be revolved independently of it. On the sprocket-wheel T' runs a chain T², which is joined to a rope T³, which rope runs over a smooth wheel X, whose shaft is journaled in the weight end of the lever. The weight-carriage W' is clamped to the rope T³ by the clamp w, so that when the rope is moved the weight W runs with it.

The end disks H H, against which the ends of the bale are pressed when being formed, have a special function, construction, and operation, as follows: As at the beginning of the operation the core is formed and made dense while the bale is not increased in diameter, it is desirable that it should meet with less resistance and not be retarded by frictional contact with the larger and heavier disks. Hence the employment of the smaller disks. The hub of each large disk H is cut out to receive a smaller disk H'. The smaller disk is provided with a stem h to enter a socket in the disk H, and around the stem h is placed a coiled spring h' to hold the smaller disk away from and slightly beyond the face of the larger one, while the smaller disk is permitted to revolve independently of the larger one. The stem h of the small disk is held in place by a key h⁴. When sufficent pressure is brought on the smaller disk, it is pushed back against the larger disk, and then the pressure of the bale will cause the larger one to revolve with it. The coiled spring behind the smaller disk may be dispensed with, so that it may still revolve under the pressure of the bale independently of the larger disk and aid in the initial formation of the bale. In order to permit the right-hand end disk to recede when the bale is finished, the hub of that disk is connected to the head of rod g at the point of the ball-bearings, as shown in Fig. 8, which rod g extends nearly through the shaft G of the pinion F and there meets the end of a screw-shaft V', which carries a hand-wheel V. By turning this wheel the right end disk is receded when the bale is finished. The friction of the larger disk in rotating against its end support, caused by the end pressure of the bale, is lessened by the balls or rollers $h^2$, which are interposed between the end of the disk-shaft and the central pinion F and which are confined between a plate on the end of the hub of the large disk and a head on the rod $g$ by the screw $h^3$.

To get the bale out of the machine, the front roller $B^2$ is detached from the sector $D^2$ and is swung upwardly. This is accomplished as follows: The shaft $C^2$ of roller $B^2$ is journaled in the arm $D^3$, Fig. 16. On arm $D^3$, which is rigidly connected to shaft $E^2$, is a sleeve $D^4$, which is rigidly connected to $D^3$. On this sleeve is placed a double hooked arm Z, which is free to turn. This hook engages rings $d'$, which rings are held on either side of the sector $D^2$ by the pin $d^2$, as indicated in Fig. 2. A duplicate hook also engages the ring on the opposite side of the sector. As the hook is raised the rings turn, thereby allowing the hook to disengage more easily. Connected to the hook Z by a short arm Z' is an adjustable link $Z^2$, which is rigidly connected to a shaft $Z^4$ by the link $Z^3$. Shaft $Z^4$ passes into arm $D^3$ at point $D^5$. A hand-lever $Z^5$ is also rigidly connected to this shaft. The shaft $Z^4$ runs back of the roller $B^2$ to the other side of the machine, where the connections are similar. This shaft permits the hooks at either end to be unfastened simultaneously after the correct adjustments have been made on link $Z^2$.

Before the bale is taken out from between the rollers it is covered with canvas wrapped spirally around it. This canvas is held and tension put on it as it feeds around the bale by a device shown in Figs. 6, 12, and 13. A reel X', containing a roll of canvas 9, is mounted on and between arms 2, which are connected to a swinging weighted frame 3. This weighted frame is mounted on the shaft 10, which is journaled in the frame A A' of the machine. In order to allow the weight to be easily moved along shaft 10, rollers 4 and 5 are provided, which are mounted on pins passed through the weight-frame and between which the rod 10 passes. Lever-arms 8 are rigidly connected to each end of a shaft 6 in supports connected to reel-arms 2. In arms 8 is loosely mounted another shaft 7. By feeding the canvas around shaft 6, then around shaft 8 as shown in Fig. 12, and then depressing the handle 8 any degree of tension required can be exerted on the canvas, causing it to be drawn tightly around the bale.

The compressing-rollers may be covered with rubber $B^5$ or some other yielding or elastic material in order to increase the friction between them and the bale and also to prevent the rollers injuring the fibers of the cotton by crushing, rust, or otherwise.

The operation of the apparatus is as follows: The driving-shaft I is connected to a suitable source of power by belt or otherwise and revolved in the direction of the arrow, Fig. 3. This motion is transmitted to the compressing-rollers by the intermediate gears, causing the three large ones to revolve in the same direction as and at a greatly-reduced speed compared to the shaft I. The small top roller revolves in an opposite direction but at the same surface speed as the large rollers. Cotton in the form of a continuous bat is now fed in between the small roller $b$ and the large roller B, between which it receives a preliminary compression, which forces out the air and gives the bat some tensile strength. The forward edge of the bat then drops down in the space inclosed by the rollers and onto the lower roller B'. Its forward edge coming in contact with opposite roller $B^2$ is rolled back on itself and a core started, on which the subsequent bat is wrapped. The first advantage of locating the rolls, so as to have two above and one below, is here apparent. The cotton is forced by gravity into the machine and the first lap is turned back upon itself by the downpour of new cotton, thus causing the formation of a core to be more positive and certain than if the rollers were located in a different manner. The core of cotton does not begin to grow in diameter at first, but increases in density until the end pressure causes the small end disk H' to revolve. The core then begins to increase in diameter and to force the rolls apart. As there is no spindle upon which the cotton is wound, there is nothing to hold the bale but the rollers. Therefore they are not forced outwardly unless the core of cotton becomes hard and dense. This makes the bale just as hard and dense at the center as it is at the outer edge. I have found by actual trial that the above is true, and that consequently the bale is as much fireproof at the center as it is farther out. When the end pressure is sufficient to force the small end disk against the coiled spring and into contact with the large end disk, the latter is started revolving. It is evident, as seen from Fig. 2, that as the rollers swing outwardly from the bale they cause the sector-supports to swing outwardly, and as the teeth on the sectors mesh with the teeth of the center block or the pinion they cause it to revolve, together with its shaft, and as the sectors at either end of the rollers are keyed to shafts they must swing outwardly in unison with one another, thereby keeping the rollers parallel and at the same distance from the common center.

In order to resist the outward movement of the rollers, I apply a resistance to the stem of the center pinion. This resistance can be produced by any well-known mechanical means; but in this machine I prefer to use a friction brake or clutch of the character already described, which will automatically increase the pressure of the rollers on the growing bale or will allow of its being increased by hand.

The operation is as follows: As the center pinion revolves the brake-wheel N, to which the pinion is rigidly connected through its stem, revolves also. The brake-sectors all point toward the center and their teeth mesh with the pinion Q, which is rigidly connected to the long brake-lever R, and both are loosely mounted on the brake-wheel shaft G. It is easily seen that a downward movement of the long end of the brake-lever R would cause all the brake-sectors to move, so as to tighten the bands around the brake-wheel. The heavier the weight or the farther out on the beam it is carried the greater will be the tension on the bands, and therefore the resistance to the outward movement of the compression-rollers increased. To automatically increase the pressure as the bale grows in diameter, I use the movement of the brake-wheel itself. This movement is communicated to the weight through the sprocket wheels and chain. As the brake-wheel N turns the sprocket-wheel N' goes with it, carrying the chain T, which runs over the sprocket-wheel $N^2$, which wheel is keyed to the shaft U, and to this shaft the sprocket-wheel T' and hand-wheel S can be clamped by the clamp-wheel S' against the collar U'. Over the sprocket-wheel T' runs the chain $T^2$, connected to the weight W by the rope $T^3$. From this it will be seen that every time the brake-wheel slips the movement causes the weight to move out a little farther on the beam, and thereby increases the pressure of the bands.

The object of dividing the brake-band into three parts is to obtain a more uniform pressure around the brake-wheel and also to reduce the distance that the brake-lever has to move.

After the bale has been covered the weight is drawn in along the brake-beam, the end disk is loosened, and the front roll unhooked. As it will be counterweighted in practice, it can easily be raised, and then the counterweights $W^2$ $W^3$ $W^4$ on the sectors D' and D, respectively, will bring the rollers B' and B into their initial positions and eject the bale. The roller $B^2$ will swing into place and hook itself to the sector $D^2$, and the machine is ready to make another bale.

Having thus described my invention, what I claim is—

1. In a baling-press, in combination with a large compressing-roller, a swinging support for said roller, and means to operate it, a smaller roller mounted over said larger roller, a swinging support for the smaller roller, means to hold the smaller roller in contact with the larger roller, and means to rotate the smaller roller in an opposite direction to the larger roller, whereby the bat fed between the larger and smaller rollers receives a preliminary compression and tensile strength, and the said rollers are maintained in alinement as they swing, substantially as described.

2. In a baling-press for the formation of cylindrical bales, in combination with compressing-rollers adapted to bear upon the surface of a bale during the formation thereof, means to operate said rollers, means to support them in contact with said bale, end rotary disks between which said bale is formed, smaller supplementary disks mounted within the former-mentioned disks, and means to permit said smaller disks to recede under the pressure of the increasing bale, substantially as described.

3. In a baling-press for the formation of cylindrical bales, the combination of two end disks between which the bale is formed, with a smaller rotary end disk loosely mounted within each of the larger end disks, to assist in the initial formation of the bale, substantially as described.

4. In a baling-press for the formation of cylindrical bales, an end disk against which the end of the bale is formed, a shaft in which the stem of said disk is loosely mounted, a rod running through said shaft provided with a head connecting with the stem of said disk, and a hand-wheel outside of the press provided with a screw-stem, said stem entering said shaft and bearing on the end of said rod, whereby the said end disk is forced inward, substantially as described.

5. In a baling-press for the formation of cylindrical bales, end disks between which the bale is formed and held, said disks provided on their inner faces with smaller disks, and means on the faces of said disks to prevent the bales from slipping, substantially as described.

6. In a baling-press for the formation of cylindrical bales, compressing-holders adapted to bear upon the surface of a bale during the formation thereof, and means to operate said rollers, in combination with swinging supports for said rollers, said supports consisting of sectors, a center block with which said sectors engage, and shafts journaled in the frame of the press on which said sectors are mounted, substantially as described.

7. In a baling-press for the formation of cylindrical bales, compressing-rollers adapted to bear upon the surface of a bale during the formation thereof, in combination with means to operate the rollers, swinging supports for said rollers, consisting of sectors, a central pinion with which said sectors engage and shafts journaled in the frame of the press on which said sectors are mounted, substantially as and for the purpose described.

8. In a baling-press for the formation of cylindrical bales, compressing-rollers adapted to bear upon the surface of a bale during the formation thereof, in combination with means to operate the rollers, swinging supports for said rollers, said supports provided with counterweights, and shafts journaled in the frame of the press on which said supports are mounted, substantially as described.

9. In a cotton-press for making cylindrical bales, the combination of a traveling pressure-surface for compressing the bale, a brake device for resisting the movement of said traveling pressure-surface and automatic means for gradually increasing the tension on said brake device, substantially as set forth.

10. In a baling-press for the formation of cylindrical bales, compressing-rollers adapted to bear upon the surface of a bale during the formation thereof and means to operate said rollers, in combination with swinging sector-supports, in which said rollers are journaled, a center pinion with which said supports engage, a brake-wheel to which said center pinion is rigidly connected, and tension means on said wheel connected with the sectors whereby the oscillation of the center pinion is controlled, substantially as described.

11. In a baling-press for the formation of cylindrical bales, the combination with compressing-rollers adapted to bear upon the surface of a bale during the formation thereof, of means to operate said rollers, the swinging sector-supports for said rollers, central pinion engaging with said supports, a brake-wheel to which the center pinion is rigidly connected, an oscillating weighted brake-lever, adapted to bring pressure on said wheel, and a movable weight on said lever, whereby an increasing resistance on said center pinion is produced as the bale increases in diameter, substantially as described.

12. In combination with the brake-sectors, the shafts on which they are mounted, the central pinion with which they engage, and the center-block shaft on which said pinion is mounted, the brake-wheel mounted on the same shaft and provided with the flexible friction-bands, said bands connected with the said sectors and the adjustable clamps and bolts for shortening and lengthening the bands and rendering the pressure uniform on the brake-wheel, substantially as described.

13. In a baling-press, the combination of a brake-wheel provided with tension-bands and a brake-lever, said wheel provided with a large sprocket-wheel, a second and smaller sprocket-wheel rigidly mounted on a shaft journaled in said brake-lever, a sprocket-chain connecting said sprocket-wheels, a third sprocket-wheel also mounted on said shaft, a clamp-wheel for rigidly clamping said third sprocket-wheel to said shaft, a sprocket-chain and rope connecting the third sprocket-wheel, and a loose wheel on the opposite end of the said brake-lever and a movable weight connected with the rope and chain, substantially as described.

14. The combination with the brake-wheel, of a brake-lever pivoted on a shaft at the center of said brake-wheel, said brake-lever provided with a loose wheel at one end, and a sprocket-wheel and hand-wheel at its opposite end, and a sprocket-chain and rope connecting said hand-wheel and sprocket-wheel with said loose wheel, a movable weight riding on said brake-lever, said weight connected to said chain and rope and moved by them, whereby the pressure on the bale is automatically increased as the bale grows in diameter, substantially as described.

15. In a baling-press for the formation of cylindrical bales, in combination with compressing-rollers adapted to bear upon the surface of a bale during the formation thereof, means to operate said rollers, means to support them in contact with said bale, a swinging arm for one of said rollers, and means for discharging the bale from the press consisting of adjustable hooks hung on said swinging arm, projections on the roller-supports with which said hooks engage, and by which hooks the said roller is connected to said roller-support, and a lever to free said hooks from said engagement and to permit the said roller to be released from contact with the bale, substantially as described.

16. In a baling-press for the formation of cylindrical bales, compressing-rollers adapted to bear upon the bale during the formation thereof, means to operate said rollers, means to support them in contact with said bale, swinging arms for one of said rollers, a double hook attached to said swinging arms and roller, a sector provided with a pin and rings mounted on said pin, with which rings said double hook engages a central pinion with which said sector engages, substantially as and for the purpose described.

17. In a baling-press for the formation of cylindrical bales, means for applying to said bale a cover before its discharge from the press consisting of the combination with a reel carrying the covering material of a swinging weighted frame, connections between said frame and reel, a shaft in the frame of the press on which said weighted frame is mounted, rollers within said frame to permit it to be moved on said shaft, rollers mounted on said weighted frame between which the cover is passed to the bale, and a lever connected with said rollers and frame to operate the same, substantially as described.

18. In a baling-press for the formation of cylindrical bales, in combination with compressing-rollers adapted to bear upon the surface of a bale during the formation thereof, means to operate said rollers, swinging supports in which said rollers are journaled, shafts to which said swinging supports are connected, a center pinion on the main driving-shaft, large gear-wheels on the shafts of said swinging supports meshing with said driving-pinion, a pinion rigidly secured to each of said large wheels, and a gear-wheel on each of the roller-shafts meshing with the said pinions on said support-shafts, substantially as described.

19. In a baling-press, in combination with compression-rollers, the swinging supports for said rollers provided with counterweights to counterbalance the weight of said rollers, substantially as described.

In testimony whereof I affix my signature in presence of two witnesses.

JOHN R. FORDYCE.

Witnesses:
H. P. DOOLITTLE,
JOS. H. BLACKWOOD.